United States Patent [19]

Pierce et al.

[11] Patent Number: 5,162,189
[45] Date of Patent: Nov. 10, 1992

[54] TONER IMAGE PRESSURE TRANSFER METHOD AND TONER USEFUL THEREFOR

[75] Inventors: Zona R. Pierce; Louis J. Sorriero, both of Rochester; Dinesh Tyagi, Fairport, all of N.Y.

[73] Assignee: Eastman Kodak Company, Rochester, N.Y.

[21] Appl. No.: 723,590

[22] Filed: Jul. 1, 1991

Related U.S. Application Data

[62] Division of Ser. No. 457,674, Dec. 27, 1989, Pat. No. 5,049,469.

[51] Int. Cl.$^5$ ............................................. G03G 13/16
[52] U.S. Cl. .................................. 430/126; 430/109; 430/98
[58] Field of Search .......................... 430/126, 109, 98

[56] References Cited

U.S. PATENT DOCUMENTS

| | | | |
|---|---|---|---|
| 3,442,645 | 5/1969 | Olden | 96/1.4 |
| 3,627,523 | 12/1971 | Shelffo | 96/1.4 |
| 3,775,104 | 11/1973 | Matsumoto et al. | 430/902 |
| 3,788,994 | 1/1974 | Wellman et al. | 252/62.1 |
| 3,843,381 | 10/1974 | Matsumoto et al. | 117/17.5 |
| 4,016,099 | 4/1977 | Wellman et al. | 430/137 |
| 4,254,201 | 3/1981 | Sawai et al. | 430/111 |
| 4,380,385 | 4/1983 | Ozaki et al. | 355/3 TR |
| 4,533,617 | 8/1985 | Inoue et al. | 430/111 |
| 4,535,049 | 8/1985 | Honda et al. | 430/137 |
| 4,590,142 | 5/1986 | Yamazaki et al. | 430/138 |
| 4,626,490 | 12/1986 | Yamazaki et al. | 430/138 |
| 4,794,065 | 12/1988 | Hedvall et al. | 430/111 |
| 4,833,060 | 5/1989 | Nair et al. | 430/137 |

FOREIGN PATENT DOCUMENTS 8807225 9/1988 PCT Int'l Appl. .

OTHER PUBLICATIONS

Abstract J52113-74C, Rico Mar. 19, 1976, "Press Fixing Microcapsule Toner for Electrostatic Photography—Has Multilayer Structure of Soft Material Core, Polymer Layer and Layer of Hard Resin Contg. Soft Polymer and Colouring Agent".

Abstract, J55073071, Mioc Nov. 28, 1978, "Pressure--Transfer of Powder Toner Image—Using Roller Comprising Dielectric Drum Anodised With Aluminum (Alloy) and Coated With Polymer".

Primary Examiner—Marion E. McCamish
Assistant Examiner—C. D. RoDee
Attorney, Agent, or Firm—Dressler, Goldsmith, Shore, Sutker & Milnamow, Ltd.

[57] ABSTRACT

Pressure-sensitive, heat-fusible, encapsulated toner particles are provided which have very uniform size and physical characteristics. A method for making the particles is provided wherein a latex copolymer functions as a stabilizer controlling particle size of the core composition of the toner particles. The latex copolymer becomes the shell composition thereof. The particles are particularly useful in a process for transferring a toned image comprised of such particles from a photoconductor to a receiver.

6 Claims, No Drawings

TONER IMAGE PRESSURE TRANSFER METHOD AND TONER USEFUL THEREFOR

This application is a division of application Ser. No. 07/457,674, filed Dec. 27, 1989, now U.S. Pat. No. 5,049,469.

FIELD OF THE INVENTION

The invention is in the field of pressure-sensitive encapsulated toner particles, methods for making such particles, and methods for using such particles for pressure transfer of a developed image from a photoconductor to a receiver.

BACKGROUND OF THE INVENTION

Various pressure sensitive encapsulated toner particles are known which have a core portion and an enveloping shell portion. For example, U.S. Pat. Nos. 4,590,142; 4,626,490 and 4,535,049 teach toner particles having a waxy core and a polymeric shell. U.S. Pat. No. 3,788,994 teaches toner powders having a core of cold flowable adhesive material and a polymeric shell. U.S. Pat. No. 4,254,201 teaches granule clusters wherein each granule has a core of pressure-sensitive adhesive. U.S. Pat. No. 4,533,617 teaches cores of binder resin and colorant coated with a thermoplastic resin shell. Japanese published Patent Application J52113-74C teaches a microcapsule toner having a soft material core that is coated with a polymer layer, and then with a hard resin layer containing soft polymer and colorant. All of such publications teach the use of such toner particles for pressure-fixing deposited toners in electrophotography, but they provide no teaching of using such particles for toned image transfer purposes.

Various patents teach techniques for accomplishing transfer of toner particle developed photoelectrostatic images from a photoconductor surface to a receiver surface using pressure. For example, U.S. Pat. Nos. 3,627,523 and 3,843,381 uses a transfer roll applied with pressure to a receiver sheet pressed against a toned image on a photoconductor to transfer the image followed by toner fixing by heat fusion on the receiver sheet. U.S. Pat. No. 3,442,645 uses applied pressure surface on a charged dielectric sheet positioned on the outside surface of a receiver sheet that is placed against a toner image on a photoconductor to transfer the toned image from to the receiver sheet. U.S. Pat. No. 4,380,385 teaches transfer of a toner powder image from a rotatable drum surface to a receiver sheet by a pressure roller whose axis is inclined relative to the drum axis to achieve a sliding action. Japanese Patent Publication No. J5503071 teaches transferring a toner powder image from a carrier to paper with a pressure roller whose circumferential surface is coated with a smooth polymer. These publications, however, do not teach using pressure sensitive encapsulated toners for toned image transfer purposes.

Toner particles comprised of a pigmented core polymer coated with fine-grained polymer particles are provided by U.S. Pat. Nos. 4,794,065 and 4,833,060 and PCT Application No. W088/07225. However, the product toner particles do not appear to be particularly pressure sensitive and no use of such toner particles for the pressure transfer of toned images is taught.

So far as is now known, no one has heretofore utilized highly pressure sensitive, encapsulated toner particles with uniform characteristics for toned image transfer from a photoconductor to a receiver member after which the so transferred toned imaged is heat fused to the receiver sheet. Also, so far as now known, no one has heretofore provided a class of highly pressure sensitive encapsulated toner particles with uniform characteristics that is reasonably storage stable, has good toner flow and is suitable for full and accurate transfer of a toned image from a photoconductor surface to a receiver surface.

SUMMARY OF THE INVENTION

This invention relates to pressure-sensitive, heat-fusible, encapsulated toner particles, to methods for making the same, and to methods for using the same for the pressure transfer of a developed toner image from the surface of a photoconductor element to the surface of a receiver sheet.

The toner particles of this invention are highly uniform with average diameters in the range of about 1 to about 20 microns. Such particles have a core composition and an enclosing shell composition. The core composition comprises colorant and charge control agent distributed uniformly through a semi-crystalline thermoplastic polymer. The polymer has a melting temperature in the range of about 40° to about 150° C., and a degree of crystallization in the range of about 5 to about 80 percent. The shell composition comprises colloidal-sized particles of a copolymer of as a nonionic oleophilic monomer, a nonionic hydrophilic monomer, an ionic monomer, and a cross-linking monomer.

The method of making the toner particles involves the steps of mixing under high shear conditions a non-aqueous liquid composition comprised of the colorant, the charge control agent, the thermoplastic polymer, and a water-immersible organic carrier liquid with an aqueous latex of the copolymer. The mixing produces a suspension of uniformly sized droplets of the non-aqueous liquid composition that are individually surrounded by particles of the latex copolymer. The organic liquid is removed from the suspension by evaporation, and the resulting particles are separated and dried.

The method of using the toner particles to transfer a toned image to a receiver sheet member involves the steps of (a) applying a fatty acid metal salt coating over the imagable surface of a photoconductor element, (b) forming a transferrable toner powder image upon the coated surface by electrostatically charging the photoconductor element, imaging the coated surface, and then applying the toner particles over the coated surface to produce a developed, transferrable image, (c) rolling a pressure roller over the toner powder image with a receiver sheet member positioned between the roller and the toner powder image while applying a pressure in the range of about 5 to about 30 pounds per lineal inch, and (d) separating the receiver sheet member from the coated surface with the toner powder image adhered to the receiver sheet member. The transferred toner powder image can then be heat fused to the receiver sheet.

Toner images can be transferred without loss of image quality and without adversely affecting the photoconductor element. The photoconductor element can be in sheet form (presently preferred) and pressure transfer can be accomplished by passing the photoconductor element and receiver sheet together in an appropriate face-to-face engagement between the nip region of a pair of cooperating, rotating pressure rollers.

Multiple copies of an imaged graphic original can be made, and full color copies of a colored graphic original can be made using the pressure transfer technique and pressure sensitive toners of this invention.

So far as is now known, nothing in the prior art teaches the low pressure rupturable, heat fusible, encapsulated toner particles that are here achieved. Also, so far as now known, nothing in the prior art teaches the present method for making pressure sensitive or rupturable heat fusible encapsulated toner particles. Further, so far as now known, nothing in the prior art teaches the present method for accomplishing pressure transfer of toned images. The present invention is believed to represent a substantial advance in the art of electrophotographic copying.

Other and further advantages, aims, features and the like will be apparent to those skilled in the art when taken with the appended claims.

DETAILED DESCRIPTION OF THE INVENTION (a) The Toner Particles

Encapsulated toner particles of the invention have average diameters in the range of about 1 to about 20 microns, and preferably in the range of about 2 to about 10 microns. Such particles each have a core portion or composition and a shell portion or composition. The particles, their cores and their shells are highly uniform in size and other physical and chemical characteristics.

It is presently preferred to employ as the core composition a mixture of:

(a) about 0 to about 20 weight percent of colorant;

(b) about 0.05 to about 5 weight percent of charge control agent; and (c) about 80 to about 99.95 weight percent of thermoplastic polymer.

The thermoplastic polymer has a melting temperature $T_m$ in the range of about 40° to about 150° C., and a degree of crystallization in the range of about 5 to about 80%.

The shell composition comprises adjoining colloidal sized particles of a cross-linked copolymer which itself comprises:

(a) about 25 to about 80 weight percent of an addition polymerizable nonionic oleophilic monomer;

(b) about 5 to about 45 weight percent of an addition polymerizable nonionic hydrophilic monomer;

(c) about 1 to about 50 weight percent of an addition polymerizable ionic monomer; and (d) about 8 to about 20 weight percent of cross-linking monomer having at least two addition polymerizable groups.

Preferably, copolymer comprises about 35 to about 65 weight percent of such nonionic oleophilic monomer, about 10 to about 35 weight percent of such nonionic hydrophilic monomer, about 10 to about 20 weight percent of such ionic monomer, and about 10 to about 15 weight percent of such cross-linking monomer.

The core composition has an average diameter in the range of about 1 to about 20 microns, and the shell composition has an average radial thickness, in the range of about 0.02 to about 0.15 microns. The particle size deviation is not greater than about 0.5 microns, and preferably is not greater than about 0.2 microns.

In the core compositions, it is presently preferred to employ condensation polyesters as the thermoplastic polymer.

Condensation polyesters can be prepared by any convenient procedure. For example, the monomers can be combined in a flask and heated to about 200° C. to achieve a homogeneous melt. The addition of catalyst results in a vigorous and steady evolution of methanol. The reaction temperatures may be increased from about 200° C. to about 240° C. over a period of about four hours. The flask is then equipped with a stirrer and connected to a source of vacuum. Stirring is employed to increase the surface to volume ratio, and vacuum is employed to remove volatile glycols. Polymerization to a desired molecular weight is achieved by monitoring the melt viscosity (torque) of the molten material. The contents are then cooled and are collected.

The following are exemplary polyesters suitable for use in the present invention:

1. poly(decamethylene sebecate)
  1.1 $T_m$ 74° C.
  1.2 Degree of crystallization=80%
  1.3 Structure:

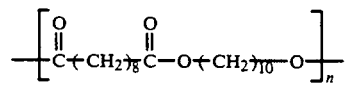

where n is a value sufficient to produce indicated $T_m$;

2. poly(hexamethylene-co-tetramethylene tereptha-late-co-isophthalate)
  2.1 $T_m=100°$ C.
  2.2 Degree of crystallization=20%
  2.3 Structure:

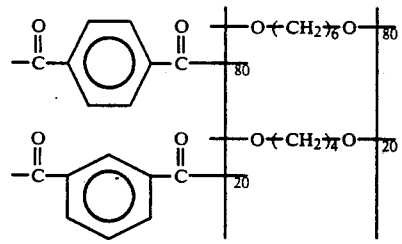

3. poly(hexamethylene succinate-co-terephthalate)
  3.1 $T_m=130°$ C.
  3.2 Degree of crystallization=30–50%
  3.3 Structure:

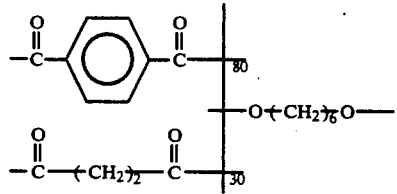

Examples of other suitable include, for example, olefin homopolymers and copolymers, such as polyethylene, polypropylene, polyisobutylene, and polyisopentylene; polyfluoroolefins, such as polytetrafluoroethylene; polyhexamethylene adipamide, polyhexamethylene sebacamide and polycaprolactam; acrylic resins, such as polymethylmethacrlate, polyacrylonitrile, ethylene-methyl acrylate copolymers, ethylene-ethyl acrylate copolymers, ethylene-ethyl methacrylate copolymers, copolymers of styrene with unsaturated monomers, cellulose derivatives, such as cellulose acetate, and ethyl cellulose; polyesters, such as polycarbonates; polyvinyl resins, such as ethylene-vinyl acetate copolymers, ethylene-vinyl alcohol copolymers, and ethylene-allyl copolymers, such as ethylene-allyl alcohol copolymers, ethylene-allyl acetone copolymers, ethylene-allyl benzene copolymers, ethylene-allyl ether copolymers, ethylene-acrylic copolymers, and polyoxymethylene; and polycondensation polymers, such as polyesters, polyurethanes, polyamides, and polycarbonates.

Colorants useful in the practice of this invention include dyes and pigments. Preferably they are either soluble or colloidally dispersible in the organic carrier liquid use for particle formation (as hereinbelow described). Suitable colorants can vary widely in composition and type, but can be selected from among the known colorants; see, for example, the dyes and pigments disclosed in U.S. Reissue Pat. No. 31,072.

Pigments preferably have ultimate particle average diameters not larger than about 0.5 microns and more preferably such particles are in the colloidal size range. For present purposes, colloidal sized particles are below about 0.10 micron in average diameter. The particular pigment selected should preferably be colloidally dispersible in such organic carrier liquid. When black toner particles of the invention are desired, a carbon black pigment is employed, such as the carbon pigment available commercially from Cabot Corp. under that company's trade designation "Regal TM 300".

Sometimes it may be desirable to reduce the particle size of a pigment from an initial size to a colloidal size range. Thus, a pigment in combination with a dispersant can be ball milled, or the like preliminarily. Suitable dispersants are known to the prior art. For example, a suitable dispersant can be a polymer, for instance a styrene-alkylene block copolymer, such as that sold by Shell Chemical Co. under its trade designation "Kraton TM 1652." If desired, the charge control agent can be present at the time of a ball milling. The milled pigment dispersion can then be blended with a thermoplastic polymer of the type used in this invention to produce a core composition. Solvent soluble or partially soluble, pigments can be employed, such as, for example, bis(phthalocyanylalumino)tetraphenyldisiloxane cyan pigments, or the like.

Suitable charge control agents can be selected from among those taught in the art; see, for example, the teachings of U.S. Pat. Nos. 3,893,935; 4,079,014; and 4,323,634; and British Patent Nos. 1,501,065 and 1,420,839.

In addition to the characteristics above indicated, the encapsulated toner particles of this invention are characterized by being heat fusible at temperatures in the range of about 60° to about 170° C., which is the temperature range associated with the heat fusion temperature of many toners known to the art. Such a heat fusion temperature is presently considered advantageous since it enables toned images on a receiver sheet to be heat fused by conventional equipment and procedures. The encapsulated toner particles are also characterized by being pressure rupturable and cold flowable at applied pressures in the range of about 5 to about 30 pounds per square inch. Because of the uniform characteristics of encapsulated toner particles of this invention, it appears that at a given rupture pressure in this range, at least about 90 weight percent of these toner particles rupture, as shown by microscopic examination, immediately after the application of such pressure.

Such toner particles also have highly uniform physical and chemical characteristics within a given batch or group of toner particles. The similarity is believed to result largely from the method of production taught herewith. Such uniform characteristics make possible high quality toner image transfer as taught by the present invention.

(b) Methods of Preparation (b.1) Dispersion Preparation

To prepare encapsulated toner particles of this invention, components of a core composition are preliminarily colloidally dispersed and/or dissolved together in a water-immersible organic carrier liquid which has a boiling point below that of water. For convenience herein, the term "dispersion" is inclusive of colloidal dispersions, true solutions, and mixtures thereof. The composition of such a dispersion on a total solids basis corresponds to the composition of a core composition as above described. The total weight percent of solids in such carrier liquid is in the range of about 15 to about 40 weight percent with the balance of the dispersion comprising the carrier liquid.

Preferably, the polymer and the charge control agent are each dissolved in the carrier liquid. If the colorant is a dye, then the dye is preferably dissolved in the carrier liquid.

Useful carrier liquids that preferably dissolve the polymer and which are also immiscible with water include, for example, chloromethane, dichloromethane, ethyl acetate, vinyl chloride, methyl ethyl ketone, trichloromethane, carbon tetrachloride, ethylene, chloride, trichlorethane, toluene, xylene, cyclohexanone, 2-nitropropane, and the like. A particularly useful carrier liquid is dichloromethane because it is both a good solvent for many polymers while at the same time it is immiscible with water. Further, its volatility is such that it can be readily removed from the discontinuous phase droplets by evaporation during particle preparation.

As described below, the dispersion is dispersed in an aqueous latex of the copolymer employed for the shell composition of the toner particles using high shear mixing conditions. The resulting mixture comprises a suspension of the dispersion of core components in the form of droplets which are surrounded by colloidal particles of the shell copolymer.

(b.2) Copolymer Preparation

The aqueous copolymer latex is separately prepared. The copolymer functions as a solid colloid stabilizer.

As with conventional solid colloid stabilizers, the hydrophilic-hydrophobic balance in the copolymers used in this invention is important since the stabilizer must collect within the aqueous medium at the interface with the suspended droplets. The proper balance can be achieved in a specific situation by appropriate selection of monomers and their respective amounts in the copolymer stabilizer. If too little oleophilic monomer is used, the copolymer does not attach to the surface of the suspension droplet; and, if too much is used, the copolymer can enter the droplet instead of staying on its surface. If too little hydrophilic monomer is used, the copolymer can enter the droplet and not remain on its surface; and, if too much is used, the copolymer can stay in the water and not attache to the droplet. If too little ionic monomer is used, the droplets can coalesce to form an unstable suspension; and, if too much is used, the copolymer can remain in the water and not attach to the surface of the droplets. The crosslinking monomer is used to prevent the copolymer from dissolving in the suspended droplet to form an unstable suspension and to provide storage stability for the pressure sensitive toner particles of this invention. If too much crosslinking monomer is present, however, the copolymer cannot attach to the surface of the droplets to stabilize the suspension. One skilled in the art can readily determine the copolymer or class of copolymers having the hydrophilic-hydrophobic balance best suited for use as a colloidal stabilizer in a particular embodiment of the present suspension process.

The monomers used in forming the stabilizers used in this invention are addition polymerizable and include monomers containing ethylenic unsaturation or more specifically vinylic, acrylic and/or allylic groups. Examples of suitable nonionic oleophilic monomers include, n-pentyl acrylate, n-butyl acrylate, benzyl acrylate, t-butyl methacrylate, 1,1-dihydroperfluorobutyl acrylate, benzyl methacrylate, and p-chloromethylstyrene, butadiene, 2-chloroethyl methacrylate, ethyl methacrylate, isobutyl acrylate, 2-ethylhexyl acrylate, 2-ethylhexyl methacrylate, chloroprene, n-butyl methacrylate, isobutyl methacrylate, isopropyl methacrylate, lauryl acrylate, lauryl methacrylate, methyl acrylate, methyl methacrylate, 2-ethoxyethyl acrylate, 2-ethoxyethyl methacrylate, 2-cyanoethyl acrylate, phenyl acrylate, isoproptl acrylate, n-propyl methacrylate, n-hexyl acrylate, styrene, sec-butyl acrylate, p-t-butylstyrene, N-t-butylacrylamide, vinyl acetate, vinyl bromide, vinylidene bromide, vinyl chloride, m- and p-vinyltoluene, methylstyrene, methyl p-styrene-sulfonate, vinylbenzyl acetate and vinyl benzoate.

Examples of suitable nonionic hydrophilic monomers that are useful for making the copolymer stabilizers used in this invention include, for example, acrylamide, allyl alcohol, n-(isobutoxymethyl)acrylamide, N-(isobutoxymethyl)methacrylamide, m- and p-vinylbenzyl alcohol, cyanomethyl methacrylate, 2-poly(ethyleneoxy)ethyl acrylate, methacryloyloxypolyglycerol, glycerol methacrylate, 2-hydroxyethyl acrylate, 2-hydroxypropyl acrylate, n-isopropylacrylamide, 2-methyl-1-vinylimidazole, 1-vinylimidazole, methacrylamide, 2-hydroxyethyl methacrylate, methacryloylurea, acrylonitrile, methacrylonitrile, N-acryloylpiperidine, 2-hydroxypropyl methacrylate, N-vinyl-2-pyrrolidine, p-aminostyrene, N,N-dimethylmethacrylamide, N-methylacrylamide, 2-methyl-5-vinylpyridine, 2-vinylpyridine, 4-vinylpyridine, N-isopropylmethacrylamide, N,N-dimethylacrylamide, 2-(diethylamino)ethyl acrylate, 2-(dimethylamino)ethyl acrylate, 2-(dimethylamino)ethyl methacrylate, and 2-(diethylamino)ethyl methacrylate. These hydrophilic monomers are well known in the art and are generally considered to be monomers that can be mixed in an excess of water, e.g., a minimum of 2 grams of monomer in 100 grams of water at 25° C., to form homogeneous solutions or dispersions in the absence of a stabilizing agent. Such a solution or dispersion has a substantially uniform composition throughout. In contrast, the oleophilic monomers previously described herein fail to meet these criteria.

Suitable ionic monomers that can be used in the copolymer stabilizers include both anionic and cationic monomers that dissociate in water at the pH at which the copolymer is prepared. Examples of such anionic monomers are aconitic acid, acrylic acid, methacrylic acid, fumaric acid, itaconic acid, maleic acid, 2-methacryloyloxyethylsulfuric acid, pyridinium 2-methacryloyloxyethylsulfate, 3-acrylamidopropane-1-sulfonic acid, p-styrenesulfonic acid, 2-acrylamido-2-methylpropanesulfonic acid, methacrylic acid, lithium methacrylate, 2-methacryloyloxyethyl-1-sulfonic acid ammonium p-styrenesulfonate, and sodium o- and p-styrenesulfonate. Examples of suitable cationic monomers include, for example, N-(3-acrylamidopropyl)ammonium methacrylate, N-(2-methacryloyloxyethyl)-N,N,N-trimethylammonium iodide, N-(2-methacryloyloxyethyl)-N,N,N-trimethylammonium p-toluenesulfonate, 1,2-dimethyl-5-vinylpyridinium methosulfate, N-(2-methacryloyloxyethyl)-N,N,N-trimethylammonium bromide, N-(2-methacryloyloxy-ethyl)-N,N,N-trimethylammonium fluoride, N-vinylbenzyl-N,N,N-trimethylammonium chloride, 3-methyl-1-vinylimidazolium methosulfate, N-(3-methacrylamidopropyl)-N-benzyl-N,N-dimethylammonium chloride, and N-(3-methacrylamidopropyl)-N,N,N-trimethylammonium chloride.

Suitable crosslinking monomers useful for making the copolymer stabilizers used in this invention include, for example, N,N'-methylene-bisacrylamide, ethylene dimethacrylate, 2,2-di-methyl-1,3-propylene diacrylate, divinylbenzene, N,N'-bis(methacryloyl)urea, 4,4'-isoproylidene-diphenylene diacrylate, 1,3-butylene diacrylate, 1,4-cyclohexylenedimethylene dimethacrylate, ethylene diacrylate, ethylidene diacrylate, 1,6-diacrylamidohexane, 1,6-hexamethylene diacrylate, 1,6-hexamethylene dimethacrylate, tetramethylene dimethacrylate, ethylenebis(oxyethylene)diacrylate, ethylenebis(oxyethylene)-dimethacrylate, ethylidyne trimethacrylate and 2-crotonoyloxyethyl methacrylate.

The copolymer stabilizers used in this invention are conveniently prepared by conventional aqueous emulsion polymerization processes, although other methods of preparation known to those skilled in the art may also be feasible. In such an emulsion polymerization process, the various monomers necessary to form the desired copolymer, together with minor amounts of ingredients such as polymerization initiators, and a surfactant or emulsifying agent are added to water. In addition to the monomers, a typical polymerization mixture can include, for example, about 35 to 97% by weight of water. The amount of water, to some extent, determines the size of the copolymer particles in that less water tends to result in larger size particles. A water-soluble free radical initiator, typically about 0.1 to about 10% by weight (based on total monomer weight), and preferably about 0.5 to about 5 weight percent, is used to initiate the polymerization. Examples of suitable initiators include redox systems comprising persulfates such as potassium persulfate or ammonium persulfate and a bisulfite such as sodium bisulfite or potassium bisulfite. Free radical initiators, such as azo compounds, as for example 4,4'-azobis(4-cyanovaleric acid) or 2,2'-azobis(2-methylpropanesulfonate), and peroxides, such as benzoyl peroxide can be used. The polymerization mixture also typically contains a surface active agent, such as sodium dodecyl sulfate, octylphenoxy-polyethoxy ethanol, sodium lauryl sulfate sodium stearate, and similar materials. Such surface active agents disperse the polymerizable monomers in the aqueous medium and concentrations are normally in the range of about 0.01 to about 0.5 parts by weight based on the total polymerization mixture.

In a typical emulsion polymerization process, the water is degassed with an inert gas such as argon or nitrogen, to remove oxygen, and the surfactant and a mixture of the monomers is added to the water. The initiator is added and the mixture is heated at about 80° to 90° C. for about 1 to 3 hours. The polymerization is complete when the monomer concentration, which can be monitored, diminishes to nearly zero. The pH is adjusted to about 7 to facilitate removal of the surfactant and the copolymer particles are stirred with a mixed bed ion exchange resin which removes surfactant.

The resulting copolymers typically have average diameters (swollen, in water) in the range of about 0.01 to about 1.0 micrometer, often about 0.01 to about 0.15 micrometer. The copolymers are solid colloidal materials that are insoluble but dispersible n water and function as excellent stabilizers. It is convenient to use them in the form of aqueous latexes.

The copolymer stabilizers used in this invention dispersion function as stabilizers of the aqueous suspension of dispersion droplets. The copolymer is a third phase because it is insoluble in both the aqueous phase and the suspended dispersion droplets. The copolymer is also non-dispersible in the droplets, but wettable by the droplets. The copolymer is more hydrophilic than oleophilic, and more hydrophilic than the dispersed or suspended droplets, so that it remains at the interface of the aqueous phase and the suspended droplets. The copolymer stabilizer particles substantially uniformly cover the surface of the suspended droplets forming a layer on the polymer particles formed in the process. The resulting particles comprise a core composition covered or enveloped by a layer of the smaller copolymer stabilizer particles. The surface or shell layer provides a hydrophilic surface that covers the hydrophobic surface of the core composition.

(b.3) Toner Particle Preparation

In the preparation method of this invention the aqueous copolymer latex is agitated with the organic carrier liquid dispersion under shearing forces that are sufficient to reduce the dispersion to small sized suspended droplets. During the period of agitation, an equilibrium is reached and the size of the droplets may increase but droplet size is regulated and stabilized by the action of the colloidal copolymer stabilizer in coating the surface of the dispersion droplets. These droplets tend to be very uniform in size. The deviation in droplet sizes from the average droplet diameter present in a given suspension is very small, being typically and illustratively not more than about ±0.5 microns.

Typically the average diameter of the stabilized droplets (which are swollen by the organic carrier liquid in the core composition) falls in the size range of about 1.5 to about 35 microns.

Evaporation of the water-immiscible organic carrier liquid can be initiated after formation of stabilized dispersion droplets. Any convenient procedure can be used to carry out non-aqueous liquid evaporation, but preferably ambient temperatures are employed in order to avoid exposing the encapsulated suspended droplets to temperatures which might adversely affect the structure thereof. One convenient procedure is to continue a low shear stirring of the aqueous suspension after formation of stabilized dispersion droplets is completed and the high shear mixing conditions are terminated.

After an initial period, the suspension can be subjected to subatmospheric pressures to evaporate residual carrier liquid, while concurrently stirring the suspension. Suitable sub-atmospheric pressures are in the range of about 5 to about 15 mm Hg.

As a result of the evaporation of the carrier liquid, the average diameter of the core compositions in the suspended particles is reduced to a size in the range of about 1 to about 20 microns.

Water dispersible or water soluble polymerizable monomer or monomers can be added to the aqueous phase and admixed therewith. The monomers may be soluble in the non-aqueous carrier liquid contained in the suspended droplets.

After the organic carrier liquid has been evaporated, the polymerizable monomer or monomer mixture, if present, is polymerized to more firmly bond the core composition and the shell composition. This polymerization procedure, for convenience and identification purposes herein, is referred to as the "suspension polymerization technique".

Suitable monomers that can be used in the suspension polymerization technique, include, for example, styrene, p-chloro-styrene; vinyl naphthalene; ethylenically unsaturated mono-olefins, such as ethylene, propylene, butylene and isobutylene; vinyl halides, such as vinyl chloride, vinyl bromide, and vinyl fluoride; vinyl acetate; vinyl propionate; vinyl benzoate; vinyl butyrate; esters of alphamethylene aliphatic monocarboxylic acids, such as methyl acrylate, ethyl acrylate, n-butylacrylate, isobutyl acrylate, dodecyl acrylate, n-octylacrylate, 2-chloroethyl acrylate, phenyl acrylate, methyl-alphachloroethyl acrylate, phenyl acrylate, methylalphachloroacrylate, methyl methacrylate, ethyl methacrylate and butyl methacrylate; acrylonitrile; methacrylonitrile; acrylamide; vinyl ethers, such as vinyl methyl ether, vinyl isobutyl ether and vinyl ethyl ether; vinyl ketones, such as vinyl methylketone, vinyl hexylketone and methyl isopropylketone; vinylidene halides, such as vinylidene chloride and vinylidene chlorofluoride; and N-vinyl compounds, such as N-vinyl pyrrole, N-vinyl carbazole, N-vinyl indole, and N-vinyl pyrrolidene; and mixtures thereof.

If desired, a chain transfer agent or crosslinking agent can be used in the suspension polymerization technique to modify the polymeric particles formed and produce particularly desired properties. Typical crosslinking agents are aromatic divinyl compounds, such as divinylbenzene, divinylnaphthalene, or derivatives thereof; diethylenecarboxylate esters, such as diethylene methacrylate, diethylene acrylate; and other divinyl compounds, such as divinyl sulfide or divinyl sulfone compounds.

In the suspension polymerization technique a catalyst or initiator which is compatible with the particular monomer or monomers used may be utilized. Typical initiators for polymerization are the peroxide and azo initiators. Among those found suitable for use in the process of this invention are 2,2'-azobis(2,4-dimethyl valeronitrile), lauroyl peroxide, and the like which result in complete polymerization without leaving detrimental residual materials or requiring very high temperatures or pressures. Chain transfer and crosslinking agents can be added to the monomer or monomers to aid in polymerization and to control the properties of the particle formed.

In order to produce encapsulated toner particles which have the desired pressure sensitivity, the total amount of polymer produced by, and added to, the particles suspended in the aqueous phase is preferably not more than about 99.5 weight percent (based on total 100% dry weight of suspended particles) and preferably not more than about 94 weight percent.

After evaporation of the carrier liquid has been accomplished, or, if employed, after the suspension polymerization technique has been carried out, the suspended particles, with their water-swollen shell compositions, are separated from the aqueous phase. At the time of separation, the suspended particles typically have average diameters in the range of about 1 to about 20 microns. Separation can be accomplished by any convenient separation procedure, such as filtration, centrifuging, or the like.

The separated particles are either reslurried in water, or washed with water, preferably distilled or deionized, until a neutral pH (pH of about 7) is achieved.

Thereafter, the particles are dried. Conveniently drying is conducted at temperatures below about 40° C. with or without the aid of subatmospheric pressures.

The dried particles comprise encapsulated toner particles of the invention. Such dried particles are characterized by having core compositions and shell composition with the respective average diameters above indicated.

(c) Methods of Use

The encapsulated toner particles of this invention are particularly well suited for use in a toner transfer process. In this process, it is presently preferred to use a photoconductor element that is in the form of a sheet one face of which is imagable and adapted for formation of a developed toner image thereon.

In the practice of the present image transfer method, one initially applies a thin coating of a fatty acid metal salt over the imagable surface of a photoconductor element. The metal in such salt is zinc or cadmium or mixture thereof, although zinc is presently preferred. A presently preferred fatty acid salt is zinc stearate. The thickness of the coating is in the range of about 20 to about 100 microns with thicknesses in the range of about 30 to about 60 microns being presently preferred.

A transferable toner powder image is formed upon the coated surface using a toner powder comprised of particles of the present invention. For example, the image can be formed by the conventional steps of first electrostatically charging the imageable surface of the photoconductor element in the dark. Thereafter, the charged surface is imaged; for example, by exposing it to a light image of a graphic original to produce a latent image of the original on the surface. Then, the toner particles are applied to the imaged surface to produce a developed image comprised of toner powder representative of the latent image on the imaged surface. The toner powder application can be accomplished conventionally using dusting, cascade development, magnetic brush development or the like.

The developed image is then transferred by rolling a pressure roller over the image with a receiver such as paper or the like, positioned between the roller and the image while maintaining a pressure between the imaged surface and the nip region of the roller that is in the range of about 5 to about 100 pounds per lineal inch and preferably in the range of about 5 to about 30 pounds per lineal inch.

The receiver is then separated from the surface and the image is transferred from the surface and adhered to the receiver. Preferably, substantially no toner powder remains on the surface. Usually, at least about 90 weight percent of the toner powder is transferred to the receiver.

The transferred toner image on the receiver can be heat fused and fixed at temperatures in the range of about 60° to about 170° C., and preferably in the range of about 60° to about 120° C. Heating time typically is in the range of about 10 to about 300 milliseconds, and preferably is about 100 to about 300 milliseconds. The temperatures and time employed for heat fusing and fixing affects annealing and the degree of crystallization achieved or desired in a heat fused toner powder.

In a presently preferred mode of practicing the present transfer process, the photoconductor element is in sheet form and has a smooth polymeric imagable surface and the receiver member is a paper sheet with a smoothness in the range of 30 to 200 Sheffield Units. The photoconductor element and such receiver are placed in an aligned, face-to-face engagement with the receiver against the imagable surface and a transferable toner image thereon. This assembly is then passed through the nip region of a pair of adjacent rollers which have spaced, parallel axes. The roller whose circumferential surface is in contact with the opposed face of the receiver has an elastomeric coating on the circumferential surface. The other roller whose circumferential surface is in contact with the opposed face of the photoconductor sheet has a non-adhering coating on the surface which is preferably comprised of polytetrafluoroethylene. One roller rotates clockwise; the other counterclockwise. Passage through such nip region preferably takes place at a constant rate of speed which is in the range of about 0.25 to about 25 ips. Preferably both rollers are driven.

Multiple transfers of an image can be made from a single latent image. Thus, the process of (a) applying a fatty acid coating, (b) forming a transferable toner powder image, (c) rolling a pressure roller over the toner powder image with a receiver sheet member therebetween, and (d) separating the receiver member with the toned image transferred thereto is initially carried out. Then, steps (b), (c) and (d) are repeated at least once with each such sequence repeat being carried out with a different receiver. Thus, multiple copies are produced.

Color copies can be prepared by the pressure transfer procedure. Thus, the indicated sequence of steps (a), (b), (c) and (d) is carried out with a colored graphic original. After step (a) is performed, steps (b), (c) and (d) are repeated with different light images of the graphic original to represent red, yellow, and blue color separations of the graphic original. A red toner powder is used to develop the latent image of the red color separation, a yellow toner powder is used to develop the latent image of the yellow color separation, and a blue toner powder is used to develop the latent image of the blue color separation. All toner powders are pressure sensitive toner powders of this invention. The same receiver is used for all pressure transfers. Then, when the receiver is separated from the photoconductor element, a full color toned image is adhered thereto. This toned image can be heat fused at about 60° to about 120° C.

(d) General

The toner particles of this invention can be used in known processes for development of latent electrostatic images formed on photoconductor elements, dielectric recording media receiver sheets, or the like, followed by heat fusing. Thus, the toner particles of this invention can be compounded with the various known additives and carrier particles to produce developer compositions usable in latent image development techniques such as powder cloud development, cascade development, magnetic brush development, and the like.

For example, the toner particles in such magnetic brush developers are formulated so that the toner particles and magnetic carrier particles have different triboelectric properties, so that when they contact each other during mixing to form the developer, they become triboelectrically charged, with the toner particles acquiring a charge of one polarity and the carrier particles acquiring a charge of the opposite polarity. These opposite charges attract each other so that the tone particles cling to the surfaces of the carrier particles. When the developer is brought into contact with a latent electrostatic image, the electrostatic forces of the latent image (sometimes in combination with an additional applied field) attract the toner particles, and the toner particles are pulled away from the carrier particles and become electrostatically attached imagewise to the latent image-bearing surface. The resultant toner image can then be transferred and fixed to the receiver surface by application of heat and/or pressure.

The toner particles of this invention can be compounded with such conventional toner additives as waxes, colorants, release agents, charge control agents, and the like.

The invention is illustrated by the following examples:

EXAMPLE 1

Preparation of Copolymer Colloidal Stabilizer

A conventional emulsion polymerization was employed using an aqueous medium containing an emulsifying agent and a water soluble free radical initiator.

A 2000 ml aqueous composition was prepared of that contained 4.5 grams sodium dodeylsulfate, 60 grams of a monomer mixture of 45 weight percent styrene, 30 weight percent 2-hydroxyethyl methacrylate, 15 weight percent methacrylic acid, and 10 weight percent, ethylene dimethacrylate. The mixture was degassed with argon and 0.26 grams of ammonium persulfate initiator was added. The mixture was polymerized at 90° C. for 2 hours. The resulting fine copolymer particles were filtered and the pH was adjusted to 7 using 0.1N aqueous potassium hydroxide. The suspension was stirred with 10 grams of a mixed bed ion-exchange resin (Amberlite MB-1 sold by Rohm & Haas) for one hour, filtered, and then diafiltered using a 1000 molecular weight cut of polysulfone membrane until all the surfactant was removed. The average diameter of the copolymer particles in water was 0.06 micron at pH 10. The latex of copolymer in water was used as a stabilizer without isolation of the copolymer.

EXAMPLE 2

Preparation of Copolymer Colloidal Stabilizer

This preparation illustrates the manufacture of copolymers useful as solid colloidal stabilizers in the practice of this invention. Like the colloidal stabilizer made in Example I, each of these copolymers provide polymer particles having the desired narrow size distribution.

Copolymers having the following compositions (% by weight based on total combined monomers present in a copolymer) and useful as solid colloidal stabilizers in the practice of this invention, were prepared according to procedure described in Example 1:

TABLE I

| | 1 | 2 | 3 | 4 | 5 | 6 | 7 |
|---|---|---|---|---|---|---|---|
| styrene | 40 | 62 | 57 | 60 | 45 | 45 | 45 |
| 2-hydroxyethyl methacrylate | 30 | 30 | 30 | 15 | 30 | 30 | 30 |
| methacrylic acid | 20 | 5 | 10 | 15 | 15 | 15 | — |
| ethyleneglycol | 10 | 3 | 3 | 10 | 10 | 10 | 10 |
| 4-vinyl pyridine | | | | | | | 15 |

For the first six copolymers shown in Table I, the preparation technique was identical except that 4.8 gms. of hexadecyltrimethylammonium bromide was used instead of the 4.5 gms. of sodium dodecyl sulfate, the temperature was maintained at 80° C., the initiator was 0.4 gms. of 2,2'-azobis(2-amidinopropane) hydrochloride instead of 0.26 gms. of ammonium persulfate, the pH was not adjusted and the latex was not slurried with the ion exchange resin as in the other preparations.

EXAMPLE 3

Dispersion Preparation

Dichloromethane (400 gms.) was poured into a 1000 ml container equipped with a magnetic stirrer. While stirring, 87 g of Polyester #1, 2 or 3 was added and allowed to dissolve completely in a tightly covered container. Thirteen (13) grams of a 50-50 weight ratio mixture of a bis(phthalocyanylalumina)tetraphenyl disiloxane cyan pigment and polyester #1, poly(decamethylene sebacate), as above identified and characterized was then added, and the solution was stirred overnight. A charge control agent, 0.2 g of stearyl dimethyl benzyl ammonium chloride (sold by Onyx Chemical Co. as "Ammonyx 4002"), was then added and the solution was stirred for an additional 90 minutes.

EXAMPLE 4

Toner Particle Formation 1500 milliters of an aqueous buffer and 75 milliters of a latex of Example 1 (2.25% solids) were combined in a 300 ml beaker.

To this composition was added 500 g of the dispersion of Example 3.

The resulting mixture of aqueous phase and organic phase was homogenized in a high shear mixer. The resulting suspension was sized and collected in a 3000 ml beaker. Dichloromethane was then allowed to evaporate while stirring for 17 hours with a glass stir rod equipped with a 15 cm paddle stirrer set at 825 rpms.

The resulting suspension was poured into a 3000 ml three neck round bottom flask equipped as above with a glass stir rod and stirred at reduced pressure to evaporate residual dichloromethane (approximately 90 minutes).

The polymer particles were collected on a fritted funnel (12–20 μm), reslurried twice with distilled water until a neutral pH was reached, collected and dried. The particles had an average diameter of 6 μm in a size range of 4 to 8 μm. They were useful as toner particles to produce sharp images and their transfer properties to a paper receiver were good.

EXAMPLE 5

Dispersion Preparation

A dichloromethane solution was prepared containing on a 100 weight percent total solution basis 95–99.5 weight percent of polyester #1, 2 or 3, above identified and characterized, and 0.5 to 5 weight percent of Rhodamine B triflate dye.

EXAMPLE 6

Toner Particle Formation 250 g of the solution of Example 5 was dispersed in water containing 0.14% of the latex of Example I under high shear conditions to form a suspension containing 24 weight percent of the polyester/dye solution. Using the solvent evaporation procedure of Example 4, it was found that the particles were completely free of solvent after stirring for 17 hours as described in Example 4. After separation and drying as described in Example 4, these particles were found to have an average particle diameter of 4.7 microns in a size range of 3 to 5 microns.

EXAMPLE 7

Pressure Transfer

A coating about 40 microns thick of zinc stearate is applied over the imaging surface of a photoconductor element.

The photoconductor element consists of a polyester binder that contains 40% (w/w) organic photoconductor. This mixture is coated onto a film base having a conductive layer.

Using the toner powder of Example 4, this so coated photoconductor element was electrostatically charged using a Corona wire, exposed to the image of a graphic original by contact exposure, and then treated with such toner powder to develop a visible image on the surface of such coating. The image was sharp with no toner aggregate on the image and no toner in the exposed region of the film.

A paper receiver sheet having a surface smoothness of 30–200 Sheffield Units was positioned over the developed toner powder image and a pressure roller was rolled over the outside or back face of such paper sheet at an applied pressure of 20 pounds per lineal inch at the roller nip region. Thereafter, the paper receiver sheet was separated from the coated surface of the photoconductor element and it is found that over 99.5 weight percent of the total weight of toner powder comprising the developed image has been transferred to this sheet.

These results show that pressure transfer of toned images produced as described using toner powders of the present invention is accomplished with high efficiency and produces high quality transferred images.

The invention has been described in detail with particular reference to preferred embodiments thereof, but it will be understood that variations and modifications can be effected within the spirit and scope of the invention.

We claim:

1. A method for producing a toned image upon a receiver comprising the steps of:
   (a) applying a thin coating of a fatty acid metal salt wherein said metal is selected from the group consisting of zinc and cadmium upon the imagable surface of a photoconductor element;
   (b) forming a transferable toner powder image upon said coating by electrostatically charging said surface, exposing the charged surface to a light image of a graphic original to produce a latent image of such original, and applying toner powder to the imaged surface to produce a developed image;
   (c) rolling a pressure roller over said toner powder image with said receiver positioned between said roller and said toner powder image while maintaining a pressure between said surface and the nip region of said roller in the range of about 5 to about 30 pounds per lineal inch; and
   (d) separating said receiver from said surface with said toner powder image adhered thereto; wherein said toner powder comprises particles having average particle diameters in the range of about 1 to about 20 microns, said particles each having a core and a highly uniform enclosing shell, said core comprising on a total core composition basis an admixture of about 0 to about 20 weight percent of colorant, about 0.05 to about 5 weight percent of charge control agent, and about 80 to about 99.95 weight percent of thermoplastic polymer having a melting temperature in the range of about 40° to about 150° C., a degree of crystallization in the range of about 5 to about 80 percent; and said shell comprises colloidal sized particles of a copolymer comprising about 25 to about 80 weight percent of an addition polymerizable nonionic oleophilic monomer; about 5 to about 45 weight percent of an addition polymerizable nonionic hydrophilic monomer; about 1 to about 50 weight percent of an addition polymerizable ionic monomer; and abut 8 to about 20 weight percent of a crosslinking monomer having at least two addition polymerizable groups.

2. The method of claim 1 wherein said fatty acid metal salt comprises zinc stearate.

3. The method of claim 1 wherein said photoconductor element is in sheet form and said receiver is a paper sheet.

4. The method of claim 3 wherein said photoconductor element and said paper sheet are continuously passed through the nip region between a pair of adjacent rollers which have spaced, parallel axes, one of said rollers being in contact with the opposed face of said paper sheet and having an elastomeric circumferential surface, the other of said rollers being in contact with the opposed face of said photoconductor and having a non-adhering circumferential surface.

5. The method of claim 4 wherein said non-adhering surface is comprised of polytetrafluoroethylene.

6. The method of claim 1 wherein said toner of powder image on said receiver is heat fused by exposing said receiver and said toner powder image to a temperature in the range of about 60° to about 120° C.

* * * * *